W. H. COLES.
PIPE COUPLING FOR IRRIGATING SYSTEMS.
APPLICATION FILED AUG. 21, 1914.
1,235,657.
Patented Aug. 7, 1917.
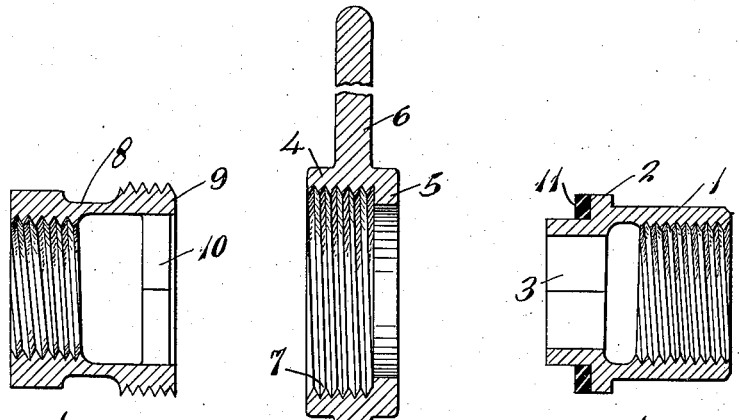
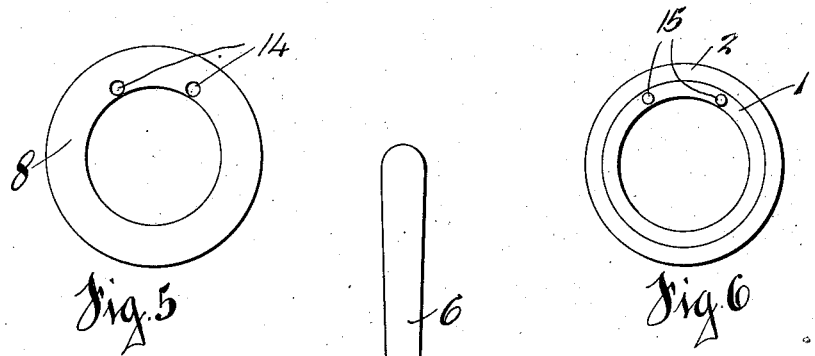
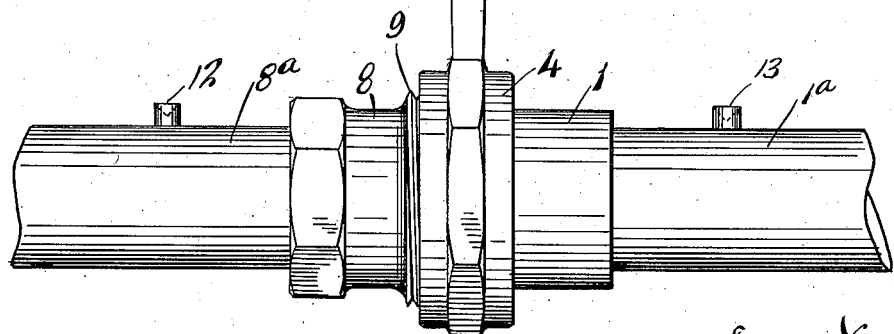

UNITED STATES PATENT OFFICE.

WALTER H. COLES, OF TROY, OHIO.

PIPE-COUPLING FOR IRRIGATING SYSTEMS.

1,235,657.  Specification of Letters Patent.  Patented Aug. 7, 1917.

Application filed August 21, 1914. Serial No. 857,803.

*To all whom it may concern:*

Be it known that I, WALTER H. COLES, a citizen of the United States, and a resident of the city of Troy, in the county of Miami and State of Ohio, have invented certain new and useful Improvements in Pipe-Couplings for Irrigating Systems, of which the following is a full, clear, and exact description, reference being had to the accompanying drawings, forming part of this specification.

In providing a coupling for the pipes in an irrigating system where there are a series of nozzles in each pipe and the pipes are rotated to swing the nozzles in an arc of say one hundred and twenty degrees, there must be rigidity of connection so that there is no play in the joint. It is also requisite to have a non-leaking fit and highly desirable to have the coupling quick and sure.

With the object of obtaining such a coupling, I have provided in my coupling a male and a female part, these parts to be squared, and other devices, as will be hereinafter specifically pointed out and claimed.

In the drawings,

Figure 1 is the coupling piece for a pipe having the female squared end, shown in vertical section.

Fig. 2 is the securing sleeve in vertical section.

Fig. 3 is a vertical section of the coupling piece for the pipe to be coupled, having the squared male part.

Fig. 4 is a side elevation of the coupling complete.

Figs. 5 and 6 are end elevations of a modified coupling.

The coupling piece 1 is designed to be screwed on a pipe, and is provided with a flange 2 to be used in holding the securing sleeve in the ordinary manner. The mouth of this piece is extended and squared as before mentioned and forms a square stud 3 to fit a squared female part on the end of the pipe to be coupled.

The securing sleeve 4 has a flange 5 to ride over the flange 2, and is provided with a handle 6 for operating. The sleeve is screwthreaded at 7 to engage the other pipe end coupling piece, which will be described.

The sleeve and coupling piece 1 are intended to remain permanently together, and permanently and rigidly on the pipe $1^a$ to which they are secured.

The coupling piece 8 for the pipe to be coupled is screwthreaded at its forward end 9, and its mouth is squared so as to form a square socket 10 adapted to receive the square stud 3 already described. A packing ring 11 is provided to rest against the shoulder formed by cutting away to form the square stud.

In making up the coupling, the piece 1 is pushed in so that the stud lies in its socket. This should be done so that the nozzle 12 in the pipe $8^a$, which is the coupled pipe, will lie on the same line as the nozzles 13 in the pipe $1^a$ (Fig. 4).

When the stud is inserted in place, the screwthreads of the coupling piece 8 and of the sleeve are lined up properly so that the sleeve can be quickly turned by means of its handle to securely clamp the coupling pieces together.

The imparting of revolving motion to the pipe $1^a$ will then impart like motion to the pipe $8^a$. The nozzles will be lined up correctly because the squaring of stud and socket will be in a like position with regard to the nozzles on each pipe and the operator can line them up exactly when pushing in the stud.

It is believed that the structure and operation of my coupling are now fully presented. By a strict description of details it is not intended to limit the scope of the claims that follow. Obvious mechanical equivalents, such as diamond or pyramid shaped male and female parts are, of course, desired to be covered without being specifically noted herein. The coupling would be a valuable one for hose, also, as well as pipes.

Another form of coupling piece which would parallel in some ways the one above shown and described, would be as follows (Figs. 5 and 6). The ends 8 and 1 would not have any special kind of orifice, but would have for alining and rigid connection, sockets 14, 14, for the female piece 8, and pins 15, 15, for the male piece 1. When the parts are put together for coupling, the pins will have to be inserted in the sockets, thereby accomplishing the same purpose as the squared orifices more accurately but with less ease and with considerably less security.

Having thus described my invention, what I claim as new and desire to secure by Letters Patent, is:—

1. In an irrigating system, in combination with a plurality of pipes, having a series of nozzles longitudinally therein, means for quick coupling said pipes so that the series of nozzles shall be in absolute line with each other, comprising interlocking members on the two pipes adapted to find their locking position when the nozzles are properly alined, a sleeve revoluble on one pipe, and screwthreads on the other pipe to engage threads on the sleeve.

2. In an irrigating system, in combination with a plurality of pipes, having a series of nozzles longitudinally therein, means for quick coupling said pipes so that the series of nozzles shall be in absolute line with each other, comprising interlocking members on the two pipes adapted to find their locking position when the nozzles are properly alined, and means for drawing and holding together said interlocking members.

WALTER H. COLES.

Witnesses:
M. T. ROSSITER,
N. L. CRAING.